(12) United States Patent
Burkes

(10) Patent No.: US 9,885,448 B2
(45) Date of Patent: Feb. 6, 2018

(54) RUBBER POLYURETHANE LINER

(71) Applicant: Irathane Systems, Inc., Hibbing, MN (US)

(72) Inventor: Daniel O. Burkes, Side Lake, MN (US)

(73) Assignee: IRATHANE SYSTEMS, INC., Hibbing, MN (US)

( * ) Notice: Subject to any disclaimer, the term of this patent is extended or adjusted under 35 U.S.C. 154(b) by 0 days.

(21) Appl. No.: 15/183,448

(22) Filed: Jun. 15, 2016

(65) Prior Publication Data

US 2016/0298811 A1    Oct. 13, 2016

Related U.S. Application Data

(60) Division of application No. 14/066,908, filed on Oct. 30, 2013, now abandoned, which is a continuation of application No. 11/040,512, filed on Jan. 21, 2005, now abandoned.

(60) Provisional application No. 60/548,003, filed on Feb. 26, 2004.

(51) Int. Cl.
*F16L 55/16* (2006.01)
*F17D 1/08* (2006.01)
*F16L 58/10* (2006.01)
*F16L 58/18* (2006.01)
*B05D 3/00* (2006.01)
*F16L 57/06* (2006.01)

(52) U.S. Cl.
CPC ............ *F17D 1/088* (2013.01); *B05D 3/007* (2013.01); *F16L 57/06* (2013.01); *F16L 58/1036* (2013.01); *F16L 58/187* (2013.01); *F17D 1/08* (2013.01); *F17D 1/084* (2013.01); *Y10T 137/0318* (2015.04)

(58) Field of Classification Search
USPC .................................... 138/98, 143, 146, 36
See application file for complete search history.

(56) References Cited

U.S. PATENT DOCUMENTS

| 2,070,291 | A | 2/1937 | McHugh ..................... 485/120 |
| 2,664,373 | A | 12/1953 | Reilly |
| 3,206,228 | A | 9/1965 | Burrell |
| 3,228,096 | A | 1/1966 | Albro |
| 3,425,455 | A | 2/1969 | Kilpert |
| 3,532,132 | A | 10/1970 | Rubenstein |

(Continued)

FOREIGN PATENT DOCUMENTS

| JP | 55-102458 | 8/1980 |
| JP | 05-220452 | 8/1993 |

OTHER PUBLICATIONS

Canadian Voluntary Submission dated Jul. 13, 2009 from corresponding Canadian Application No. 2460297.

(Continued)

*Primary Examiner* — James Hook
(74) *Attorney, Agent, or Firm* — Steven M. Koehler; Westman, Champlin & Koehler, P.A.

(57) ABSTRACT

A liner includes a rubber liner portion, and a polyurethane liner portion disposed on a surface of the rubber liner portion. The rubber polyurethane liner can be applied to cover surfaces of process support elements used to transport or handle process material such as tar sand slurry. The rubber polyurethane liner increases the effectiveness and operating lifetimes of such process support elements.

19 Claims, 4 Drawing Sheets

(56) References Cited

U.S. PATENT DOCUMENTS

| | | | |
|---|---|---|---|
| 3,615,984 A | 10/1971 | Chase | |
| 3,771,758 A | 11/1973 | Little | |
| 3,772,071 A | 11/1973 | Harr | |
| 3,862,921 A | 1/1975 | Webster et al. | |
| 4,042,559 A | 8/1977 | Abelson | |
| 4,077,928 A | 3/1978 | Koons | 524/59 |
| 4,169,906 A | 10/1979 | Hallstrom et al. | 428/183 |
| 4,254,165 A | 3/1981 | Phelps | |
| 4,389,439 A | 6/1983 | Clark et al. | |
| 4,576,205 A | 3/1986 | Morinaga et al. | 138/98 |
| 4,600,615 A | 7/1986 | Hyodo | |
| 4,606,953 A | 8/1986 | Suzuki et al. | 428/36 |
| 4,645,055 A | 2/1987 | Griese et al. | 193/2 |
| 4,684,155 A | 8/1987 | Davis | |
| 4,933,235 A | 6/1990 | Kellner | 428/355 |
| 4,972,880 A * | 11/1990 | Strand | F16L 55/163 138/103 |
| 5,037,600 A | 8/1991 | Upchurch | |
| 5,077,107 A | 12/1991 | Kaneda et al. | 428/36.1 |
| 5,164,237 A | 11/1992 | Kaneda et al. | 428/34.7 |
| 5,560,395 A | 10/1996 | Bissonnette | 138/98 |
| 5,566,721 A | 10/1996 | Breese | |
| 5,915,419 A | 6/1999 | Tweedie | |
| 6,009,912 A | 1/2000 | Andre | |
| 6,058,978 A | 5/2000 | Paletta et al. | |
| 6,138,718 A | 10/2000 | Maimets | 138/98 |
| 6,167,913 B1 | 1/2001 | Wood et al. | |
| 6,293,311 B1 | 9/2001 | Bushi | |
| 6,397,895 B1 | 6/2002 | Lively | |
| 6,521,680 B1 | 2/2003 | Durot | 524/59 |
| 6,527,015 B2 | 3/2003 | Lively | 138/149 |
| 6,554,539 B1 | 4/2003 | Radlinger | 405/184.2 |
| 6,612,343 B2 | 9/2003 | Camberlin | |
| 6,737,134 B2 * | 5/2004 | Friedrich | B32B 1/08 138/97 |
| 6,976,510 B2 | 12/2005 | Campagna | |
| 7,320,341 B2 * | 1/2008 | Brandys | F16L 57/06 138/141 |
| 7,575,789 B2 | 8/2009 | McKeen | |
| 8,728,600 B1 * | 5/2014 | Hayes | C08F 255/00 137/1 |
| 2002/0005223 A1 | 1/2002 | Campagna et al. | |
| 2003/0207118 A1 | 11/2003 | Fukushi | 428/421 |
| 2005/0173012 A1 | 8/2005 | McKeen | |
| 2005/0189028 A1 * | 9/2005 | Burkes | F16L 58/1036 138/98 |
| 2005/0229992 A1 | 10/2005 | McKeen | |
| 2006/0054231 A1 | 3/2006 | Wolfram et al. | |
| 2006/0108016 A1 | 5/2006 | Funatsu | |
| 2007/0267082 A1 | 11/2007 | Brandys et al. | |
| 2008/0174110 A1 | 7/2008 | Olson | |
| 2009/0107572 A1 | 4/2009 | Hayes | |
| 2010/0108173 A1 | 5/2010 | Hayes | |
| 2010/0112248 A1 | 5/2010 | Hayes | |
| 2010/0263761 A1 * | 10/2010 | Niccolls | B32B 1/08 138/146 |
| 2010/0266790 A1 * | 10/2010 | Kusinski | B32B 1/08 428/34.6 |

OTHER PUBLICATIONS

Canadian Office Action dated Jan. 11, 2011 from corresponding Canadian Application No. 2460297.
Canadian Amendment dated Jul. 8, 2011 from corresponding Canadian Application No. 2460297.
Office Action dated Sep. 13, 2011 from corresponding Canadian Application No. 2460297.
Canadian Amendment dated Mar. 13, 2012 from corresponding Canadian Application No. 2460297.
Office Action dated Jul. 26, 2012 from corresponding Canadian Application No. 2460297.
Canadian Amendment dated Nov. 14, 2012 from corresponding Canadian Application No. 2460297.
Canadian Voluntary Submission dated Nov. 28, 2012 from corresponding Canadian Application No. 2460297.
Office Action dated May 23, 2013 from corresponding Canadian Application No. 2460297.
Canadian Amendment dated Sep. 12, 2013 from corresponding Canadian Application No. 2460297.
Canadian Notice dated Sep. 23, 2013 from corresponding Canadian Application No. 2460297.
Canadian Amendment dated Oct. 10, 2013 from corresponding Canadian Application No. 2460297.
Canadian Office Action dated Dec. 17, 2013 from corresponding Canadian Application No. 2460297.
Canadian Amendment dated Jun. 17, 2014 from corresponding Canadian Application No. 2460297.
Canadian Office Action dated Jan. 7, 2015 from corresponding Canadian Application No. 2460297.
Canadian Notice of Withdrawal of Office Action dated Feb. 18, 2015 from corresponding Canadian Application No. 2460297.
Canadian Office Action dated Feb. 27, 2015 from corresponding Canadian Application No. 2460297.
Canadian Amendment dated Jun. 12, 2015 from corresponding Canadian Application No. 2460297.
Canadian Voluntary Submission dated Aug. 7, 2015 from corresponding Canadian Application No. 2460297.
IRP—Blabber Lined Pipe, Products, copyright 1998, 1999 Industrial Rubber Products.
Industrial Rubber Applicators, Inc., World Class Industrial Pipe Lining Applicators, published prior to Feb. 26, 2013.
"There's oil in them thar sands!", The Economist, Jun. 26, 2003.
Paul Krugman, "The Oil Crunch", The New York Times, May 7, 2004 (paragraph 5).
"Industrial Rubber Testing New Lined Pipe Product", Yahoo Finance/PR Newsire, Apr. 15, 2004 (http://biz.yahoo.com/prnews/040415/cgth048_1.html, accessed May 13, 2004).
"Suncor Energy: Straight Forward", Suncor Energy Inc. (http://www.suncor.com/data/1/rec_docs/99_S.17.213%20AboutSensor.pdf, accessed May 13, 2004).
Declaration of Background Information executed by Daniel O. Burkes on Jan. 12, 2005 and filed with the U.S.Patent and Trademark Office with this application dated Jan. 21, 2005.
Official Action from the Canadian Patent Office for related Canadian Patent Application 2,460,297, filed Mar. 9, 2004.

* cited by examiner

RUBBER POLYURETHANE LINER

CROSS-REFERENCE TO RELATED APPLICATION

This Application is a Divisional Application of U.S. application Ser. No. 14/066,908, filed Oct. 30, 2013, which is a Continuation Application of U.S. patent application Ser. No. 11/040,512, filed Jan. 21, 2005, and claims the benefit of Application of U.S. Provisional Application No. 60/548,003, filed on Feb. 26, 2004, the contents of which are incorporated herein by reference in their entirety.

FIELD OF THE INVENTION

The present invention relates to liners, and particularly but not by way of limitation, to liners with a rubber layer and a polyurethane layer.

BACKGROUND OF THE INVENTION

There has been a persistent need to transport slurry materials through pipelines. Plain steel pipes were once commonly used for this purpose, but breakdown due to abrasion from the slurry material severely limited the functional lifetime of such a steel pipe. A breakthrough came with the introduction of a rubber liner in the steel pipe, which raised the functional lifetime of a steel pipe by around 500%. Rubber-lined steel became commonly used for pipelines in mining and energy development applications around the world.

However, rubber liners continue to involve persistent challenges, including expensive and problematic procedures to apply a rubber liner to a steel pipe, and significant deterioration over time of the rubber liner due to exposure to heat, hydrocarbons, and particulate matter.

New liners composed of materials such as polyurethane were introduced as an alternative to rubber liners. Polyurethane liners offered advantageous properties for resisting breakdown due to particulate matter. However, polyurethane liners also had significant performance drawbacks, including significant deterioration over time due to high levels of heat, and permeability to slurry transport fluid which often leads to blistering and disbondment of the liner from the pipe, a failure mode known as "cold wall effect".

While no ideal pipeline liner solution has been available, the applications for liners have become ever more demanding, owing to the constant effort to develop new and often more challenging options in materials and energy resource extraction. For example, there is a growing interest in extracting energy resources from tar sands, which hold a tremendous potential for new energy development. However, extraction of energy resources from tar sands imposes harsh demands on equipment. Tar sands are typically extracted from the ground in a slurry including hydrocarbons, hot water, and particulate sand and rock material with particles up to four inches and greater in diameter.

Many types of traditional pipes and pipe liners have been applied in such tar sand applications, including rubber liners and polyurethane liners. However, under such extreme conditions, these liners quickly break down due to hydrocarbons, heat, abrasion by the particulate matter, and cold wall effect. Instead, the typical liner of choice in tar sand applications has become a hardened steel liner called chrome carbide overlay (CCO). CCO liners are extremely expensive and still have only marginal resistance to abrasion by the particulate matter. For example, typical CCO liners have been priced at several hundred dollars per foot, and have endured for only approximately three months of application in transporting tar sand slurry before failing and requiring replacement.

Therefore, there exists a substantial need for an improved solution for pipelines and other process support elements to transport or handle material under a wide range of conditions, such as those typically encountered in transporting tar sand slurries, for example.

SUMMARY OF THE INVENTION

One embodiment of the present invention pertains to a liner, including a rubber liner portion, and a polyurethane liner portion disposed on a surface of the rubber liner portion.

Another embodiment of the present invention pertains to a lined support element, including a support element, a rubber liner portion disposed on a surface of the support element, and a polyurethane liner portion disposed on a surface of the rubber liner portion.

Another embodiment of the present invention pertains to a process, including the steps of applying a rubber liner portion to a surface of a support element, and applying a polyurethane liner portion to a surface of the rubber liner portion.

Additional objects, features, and advantages of the present invention may be discerned through the corresponding description and figures, and inferred by those in the art from the general teaching of the present disclosure and in the course of practicing, manufacturing, using, and otherwise experiencing different embodiments, as defined by the appended claims.

DETAILED DESCRIPTION OF ILLUSTRATIVE EMBODIMENTS

Figure 1:
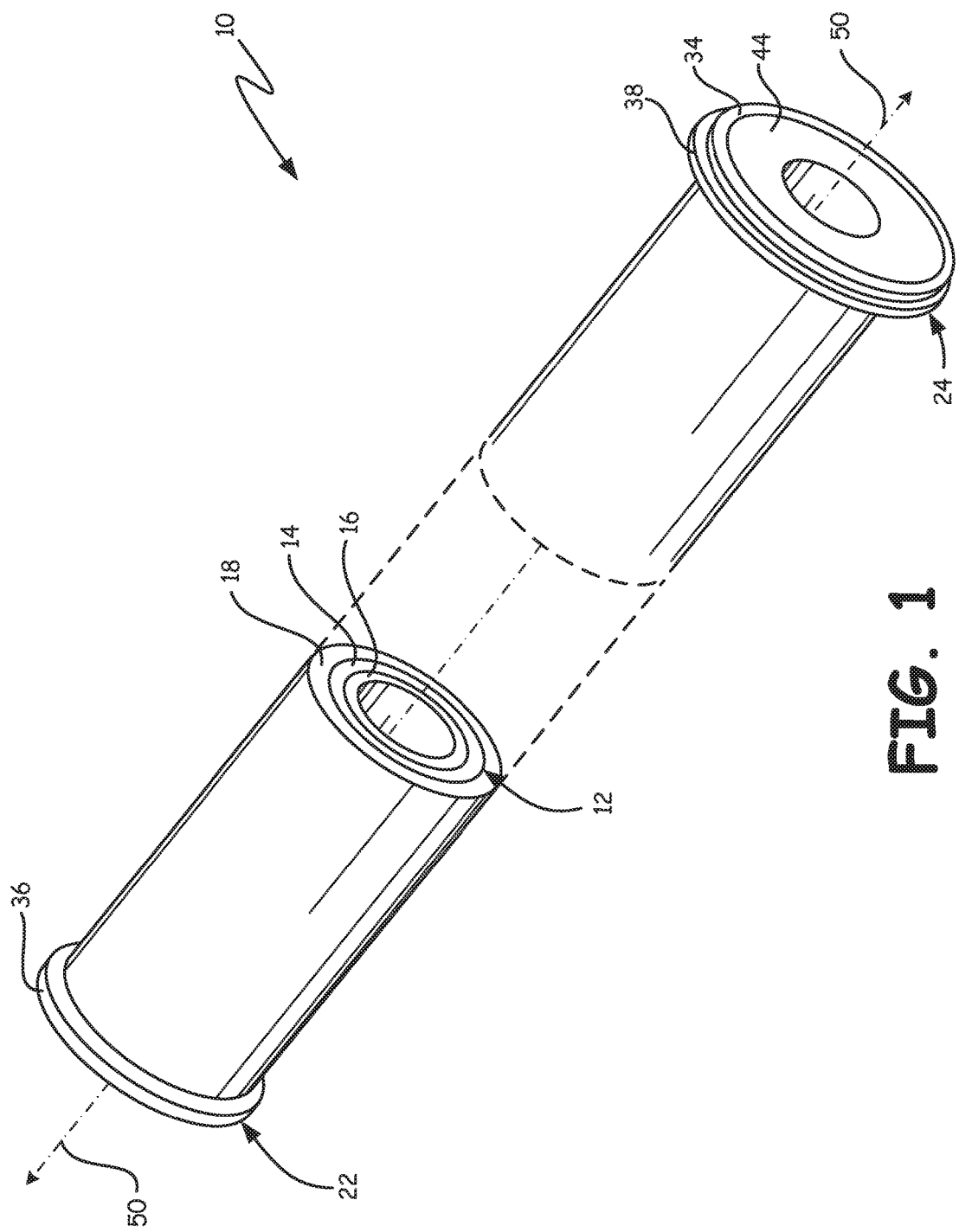
FIG. 1 illustrates a perspective, cutaway view of a lined pipe with liner, according to one illustrative embodiment.
Figure 2:
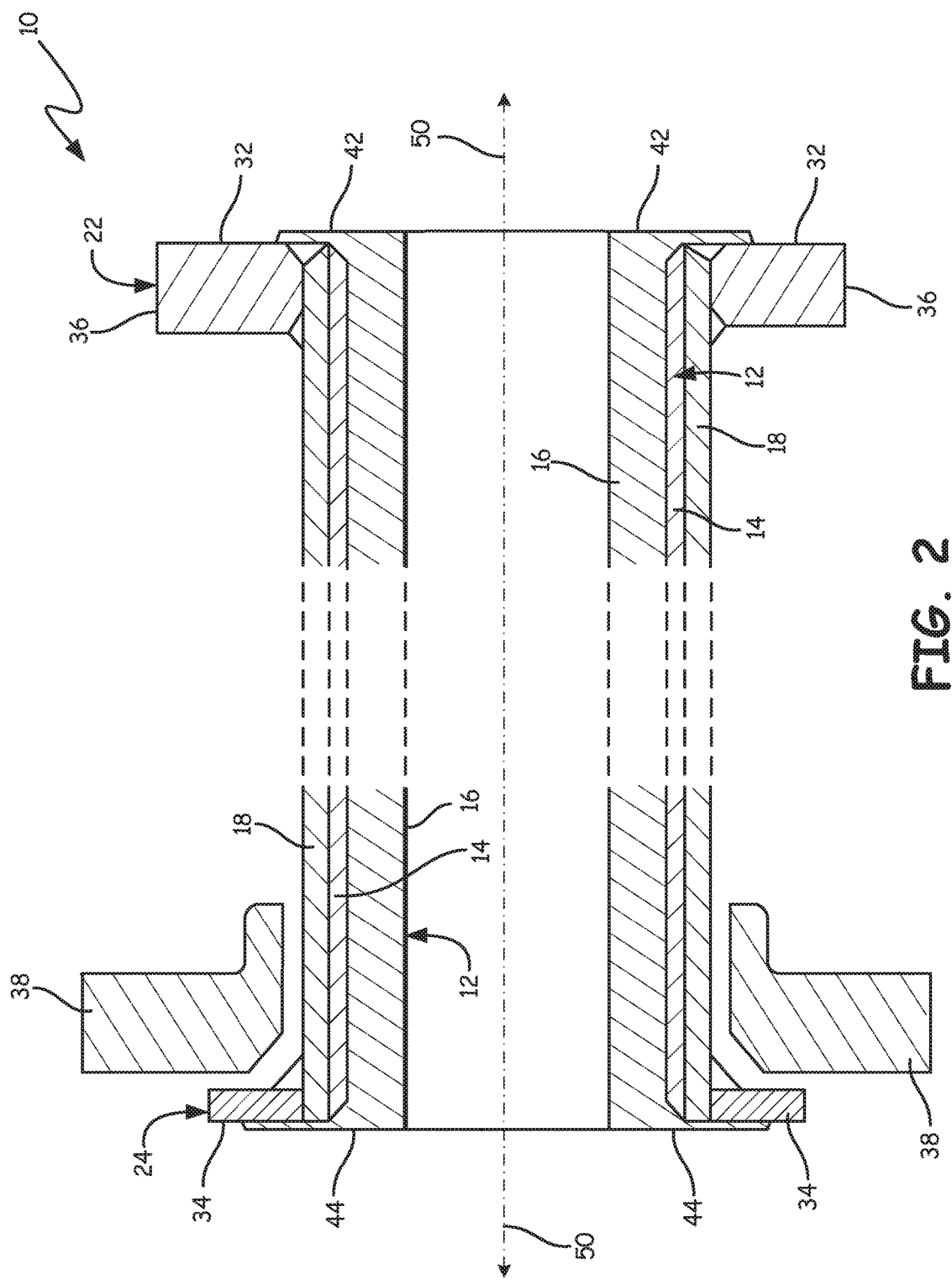
FIG. 2 illustrates a side, cross sectional, cutaway view of a lined pipe with liner, according to one illustrative embodiment.

FIG. 1 illustrates a perspective, cutaway view of a lined pipe 10 with liner 12, according to one illustrative embodiment. FIG. 2 illustrates a side, cross sectional, cutaway view of the lined pipe 10 with liner 12, according to one illustrative embodiment. Liner 12 includes both a rubber liner portion 14 adhered to an inner surface of pipe portion 18, and a polyurethane liner portion 16 adhered to and covering rubber liner portion 14. Lined pipe 10 has a first end 22 and a second end 24 opposite the first end 22. First end 22 includes pipe end surface 32 and polyurethane end surface 42 (both depicted only in FIG. 2) and slip-on flange 36. Second end 24 includes pipe end surface 34, polyurethane end surface 44, and lap joint flange 38. FIG. 2 also depicts end caps 66 and 68 for attaching to first end 22 and second end 24, respectively. Slip-on flange 36, lap joint flange 38, and end caps 66 and 68 are a few examples of a wide variety of flanges, tooling, and other supplemental structures that may be added to lined pipe 10.

Lined pipe 10 is substantially axially symmetric about longitudinal axis 50. FIG. 1 and FIG. 2 both portray a section of lined pipe 10 in cutaway, which aids in depicting the structure thereof, in FIG. 1 in particular. Lined pipe 10 performs advantageously for transporting slurry with large particles, hot operating temperatures, and substantial hydrocarbon content, for example, with a far longer operating lifetime and at a lower cost than any prior solutions such as chrome carbide overlay (CCO), for example.

Lined pipe 10 illustrated and described herein is one exemplary embodiment of a lined process support element, or simply a lined support element, that benefits from the application of a liner of the present invention such as liner 12. Pipe portion 18 is one example of a device which can be referred to as a process support element or simply a support element, that is used to transport or otherwise handle process material such as tar sand slurry, as one example, and that can perform more advantageously when combined with a liner of the present invention such as liner 12 to form a lined support element of the present invention.

Other support elements that can perform advantageously with application of a liner of the present invention include but are not limited to pulleys, rolls, cyclones, tanks, pumps, screens, classifier shoes, hoses, nozzles, load hoppers, feeders, surge bins, crushers, discharge chutes and sleeves, and other products, for example. Each of these support elements, among others and similar devices, can be lined with liner 12 in a manner similar to the process described below with respect to lined pipe 10.

Figure 3:
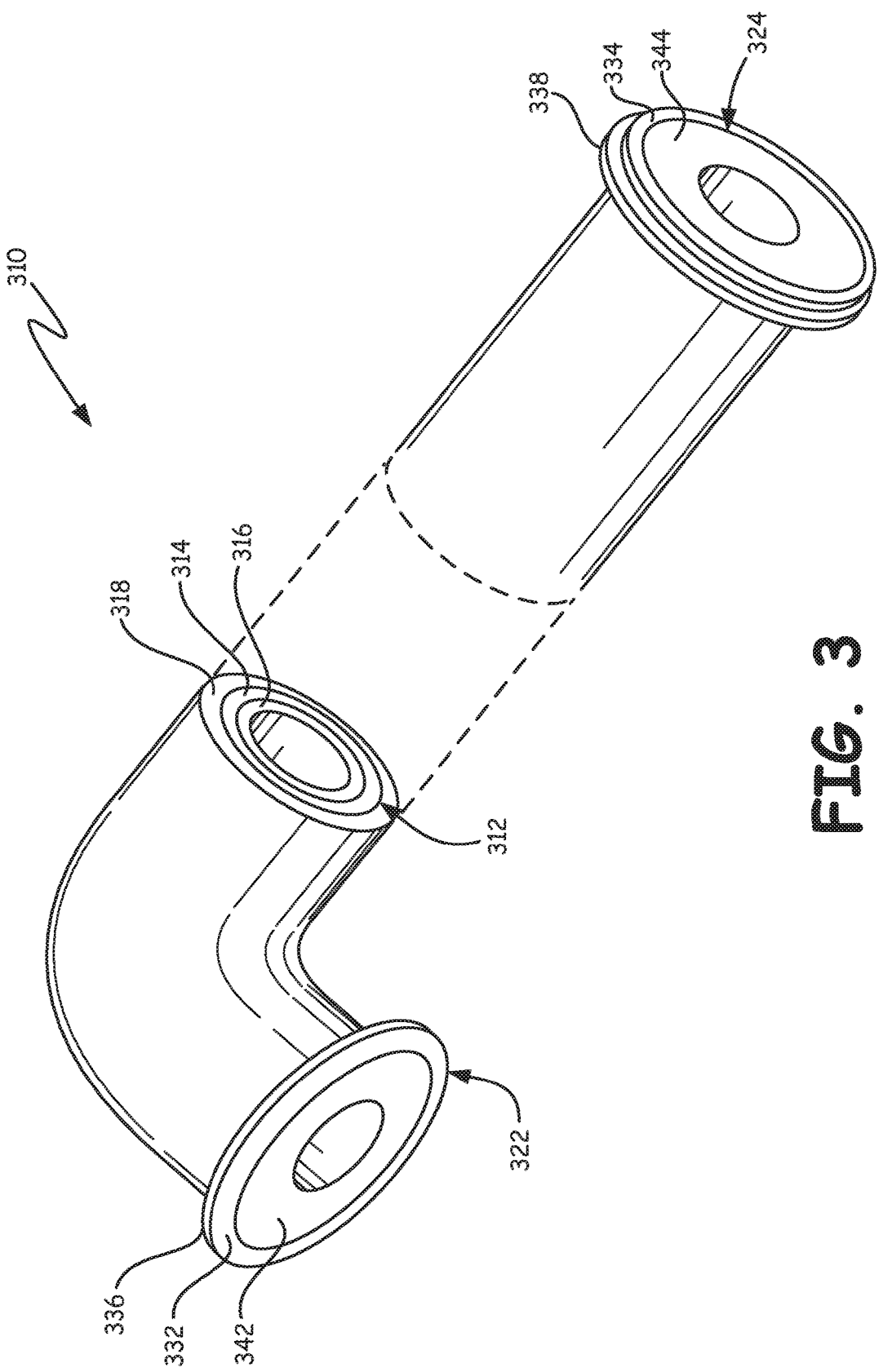
FIG. 3 illustrates a perspective, cutaway view of a lined piping elbow with liner, according to one illustrative embodiment.

As another illustrative example of this variety of support elements of the present invention, FIG. 3 illustrates a lined piping elbow 310 equipped with liner 312, according to another exemplary embodiment.

Pipe portion 18 and other similar process support elements may be composed, at least in part, of a metal such as steel or aluminum, or other materials such as plastic, carbon composite, or any of a variety of similar materials.

Lined pipe 10 with rubber polyurethane liner 12 is formed in a process including a series of application steps, such as the illustrative process 400 depicted in FIG. 4 and described below, which exemplifies one embodiment of a method for making lined pipe 10. Many alternative embodiments of process 400 exist in which specific steps take different forms, or are done in a different order, or in which some of the specific steps included here are not performed, or in which additional steps not mentioned here are performed. The process 400 of providing a pipe portion 18 with a liner 12 generally includes the step 410 of applying a rubber liner portion 14 to a surface of a support element, exemplified herein as pipe portion 18, and the step 420 of applying a polyurethane liner portion 16 to a surface of rubber liner portion 14. As opposed to prior art process support elements with only a rubber liner which is entirely exposed to the process material, step 420 of applying the polyurethane liner includes covering the rubber liner portion 14 with polyurethane liner portion 16, thereby significantly inhibiting contact by the process material with rubber liner portion 14, in this embodiment.

In one illustrative embodiment, step 410 of applying a rubber liner portion 14 to a surface of pipe portion 18 includes step 411 of preparing a surface of pipe portion 18. For example, in one embodiment the step 411 of preparing a surface of pipe portion 18 includes the inner surface of pipe portion 18 being grit blasted to the condition known as SSPC-SP5 white metal, a surface preparation standard defined by the Steel Structure Painting Council (SSPC). This standard includes, for instance, that a white metal blast cleaned surface, when viewed without magnification, shall be free of all visible oil, grease, dust, dirt, mill scale, rust, coating, oxides, corrosion products, and other foreign matter.

Pipe portion 18 is blasted to a 2 to 4 mil profile. In various alternative embodiments of the method, the profile may have a depth that is less or greater than this range, such as 1 mil or 6 mil, for example; or a different surface standard may be used, such as SSPC-SP6 commercial blast cleaning, or SSPC-SP10 near-white blast cleaning, for example; or the inner surface of pipe portion 18 may be vapor degreased prior to blasting, or solvent degreased or alkaline cleaned with rust inhibitor in a rinse after blasting, for example.

In this embodiment, the step 411 of preparing a surface of pipe portion 18 is followed by the step 412 of applying adhesive to a surface of pipe portion 18. This may include applying a number of different adhesives. For example, in step 413, a rubber to steel priming compound, such as a solvent based rubber adhesive primer, is applied to the inner surface of pipe portion 18 after step 411, in the embodiment of FIG. 4. This first adhesive primer may be the rubber adhesive primer marketed as Chemlok 220 by Lord Corporation Chemical Products, for example.

This first adhesive primer is applied to the inner surface of pipe portion 18 typically within about four hours of the grit-blasting, which is followed by a typical drying time of around two hours, according to one embodiment. The curing or drying times specified above, and through the remainder of the description below, are merely illustrative of one particular embodiment. In the variety of embodiments, curing and drying times vary depending on a variety of factors, including sensitivity to environmental factors such as temperature and humidity conditions, the specific types of adhesives, primers, and cements used, the specific types of metals, rubbers, polyurethane, or other materials used, and other factors.

Following step 413 of effectively applying a rubber to steel priming compound to a surface of pipe portion 18, step 412 also includes the step 414 of applying an additional adhesive, well suited for grit-blasted steel, to the inner surface of pipe portion 18, according to this embodiment. This additional adhesive may be the adhesive produced and marketed as Chemlok Ty-Ply RC by Lord Corporation Chemical Products, for example. This application should be followed by a typical dry time of around fifteen minutes, according to step 414 in the embodiment of FIG. 4.

Figure 4:
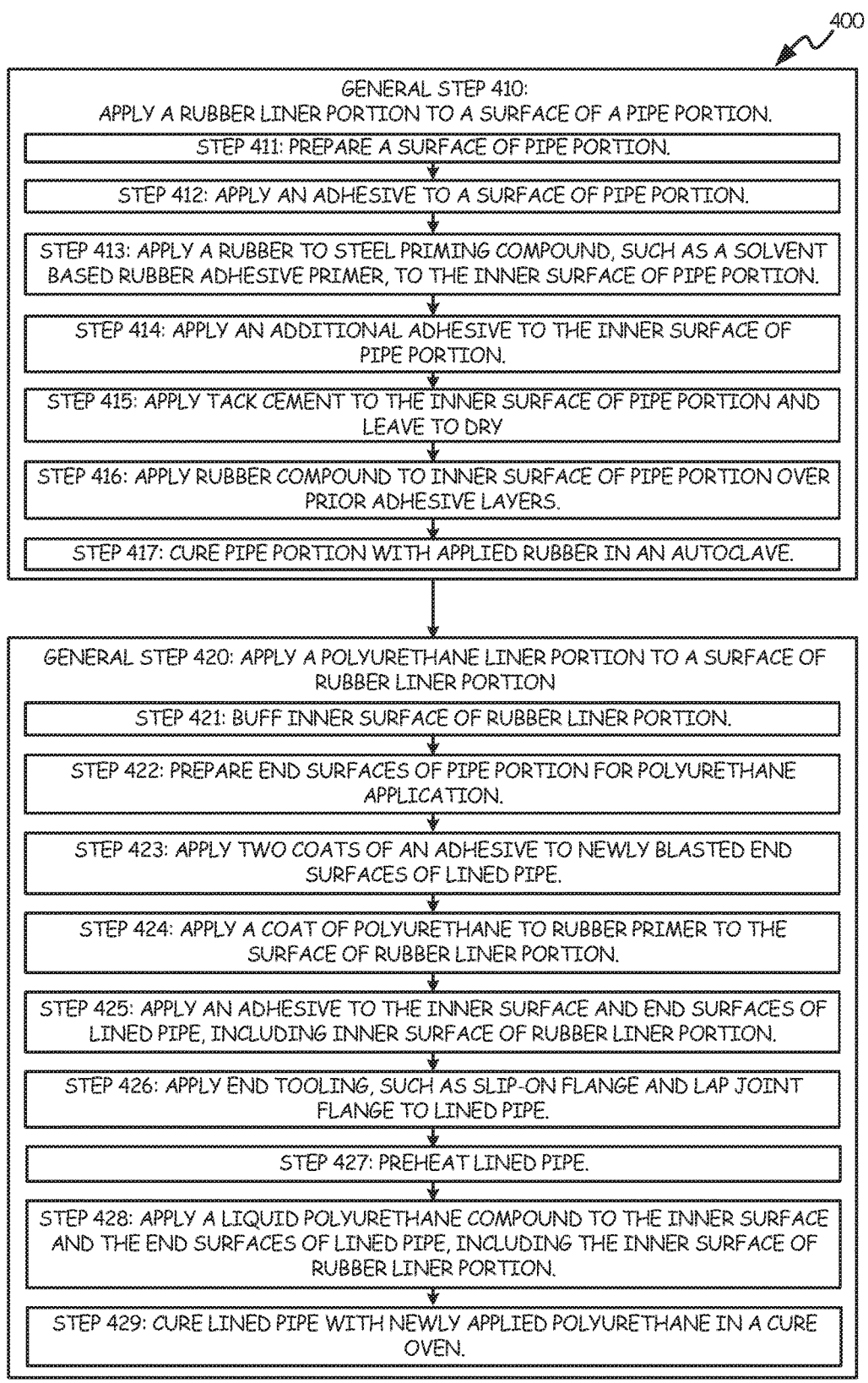
FIG. 4 illustrates a flow chart for a method of applying a liner, according to one illustrative embodiment.

Tack cement is then applied to the inner surface of pipe portion 18 and left to dry for typically around thirty minutes, as step 415 of step 412, according to the embodiment of FIG. 4. The rubber to steel priming compound, the additional primer adhesive, and the tack cement are all generally categorized as adhesives, applied as part of step 410 in the embodiment of FIG. 4.

A rubber compound is then prepared and applied to the inner surface of pipe portion 18 over the prior adhesive layers, as step 416 in the embodiment of FIG. 4. For example, the rubber compound produced by Industrial Rubber Products, Inc. as rubber compound #8220 may be used. The embodiment described uses the example of autoclave cured rubber, while other methods of rubber application, such as cold bonded rubber, occur in other embodiments. The rubber may be cut from a larger rubber sheet, formed into a tube, and fitted to the inner surface of pipe portion 18, for example. Alternatively, the rubber may be applied to the inner surface of pipe portion 18 and over the prior adhesive layers by another method such as extrusion blow molding, for instance.

Pipe portion 18 with applied rubber is then cured in an autoclave as step 417 in the embodiment of FIG. 4. Step 417 results in the applied rubber taking the form of rubber liner portion 14 and adhering securely to the inner surface of pipe portion 18. In one embodiment, rubber liner portion 14 has a durometer measure of or approximately 40 with a type A durometer in this embodiment, according to the D2240 Standard Test Method for Rubber Property, as defined by the American Society for Testing and Materials (ASTM). Rubber liner portion 14 having a durometer measure between 20 and 60 with a type A durometer, can be used in alternative embodiments. These values are understood to be substantially similar to 40, given that they would indicate similar performance under many applications and in many desired embodiments. Durometer measure may also vary within normal tolerance limits familiar to those in the art. For example, rubber liner portion 14 having a type A durometer measure of 40 according to one instrument may measure 35 or 45 or otherwise with another instrument, and be understood to be substantially equal to 40. Still other durometer measures occur in alternative embodiments, both higher and lower than the range discussed above.

Rubber liner portion 14 provides a number of advantages. It acts as a bonding agent between pipe portion 18 and polyurethane liner portion 16. Rubber liner portion 14 also acts as a permeability barrier to prevent blistering or disbondment of polyurethane liner portion 16 such as due to cold wall effect. Rubber liner portion 14 also provides cushioning for the impacts of particulate matter such as in a slurry transported through lined pipe 10, including through any additional layers applied over it such as polyurethane liner portion 16, discussed below.

With the completion of step 410, the step 420 of applying a polyurethane liner portion 16 to a surface of rubber liner portion 14 is performed, in this embodiment. Like step 410, step 420 may include a number of component steps. For example, once rubber liner portion 14 has been cured in adhesion to pipe portion 18 in step 417, step 420 of applying a polyurethane liner portion 16 includes buffing the inner surface of rubber liner portion 14 as step 421 of the embodiment of FIG. 4, to prepare rubber liner portion 14 for the application of polyurethane liner portion 16. A buffing machine is used to buff the inner surface of rubber liner portion 14 to a rough texture to ensure effective chemical and mechanical bonding between the rubber liner portion 14 and the polyurethane liner portion 16, in this embodiment.

After rubber liner portion 14 is buffed in step 421, the two pipe end surfaces 32 and 34 of pipe portion 18 are prepared for polyurethane application in step 422. This includes pipe end surfaces 32 and 34 being grit-blasted to a white metal SSPC-SP5 surface with a 2 to 4 mil profile in this embodiment, as described above with reference to the inner surface of pipe portion 18. Other profile depths are contemplated for alternative embodiments, such as including 1 mil or 6 mil, for example.

In step 423, two coats of an adhesive, well suited for polyurethane, are then applied to the newly blasted pipe end surfaces 32 and 34 of lined pipe 10, though not to the inner surface of rubber liner portion 14. This adhesive may be, for example, the adhesive produced by Irathane Systems, Inc. as F68, for example. The first coat of this adhesive is typically applied within about four hours after blasting, and is left to dry for typically around one half hour in this embodiment. The second coat of adhesive is left to dry for typically anywhere from about one and a half hours to about seventy-two hours, in this embodiment.

A coat of polyurethane to rubber primer is then applied to the inner surface of rubber liner portion 14, though not to any steel surface, in step 424. This adhesive may be, for example, the adhesive produced by Irathane Systems, Inc. as RU-80. This polyurethane to rubber primer is left to dry, typically for anywhere from about four hours to about twenty-four hours, in this embodiment.

In step 425, an adhesive is then applied to both the inner surface and pipe end surfaces 32 and 34 of lined pipe 10, including the inner surface of rubber liner portion 14. This adhesive may be, for example, the adhesive produced by Irathane Systems, Inc. as ADH-215, for example. This is performed within or close to the seventy-two hour typical dry time of the most recent adhesive application to pipe end surfaces 32 and 34, and within or close to the twenty-four hour typical dry time of the polyurethane to rubber primer. The adhesive of step 425, in turn, is left for a typical dry time of anywhere from around one hour to around eight hours, in this embodiment. The primers and adhesives discussed above may generally be categorized as adhesives.

End tooling and/or flanges, such as slip-on flange 36 and lap joint flange 38, may be applied to lined pipe 10 in step 426, as in the embodiment of FIG. 4. Slip-on flange 36 and lap joint flange 38 are two examples of a wide variety of flanges, end tooling, and other supplemental structures that may be added to lined pipe 10.

In step 427, lined pipe 10 is then preheated at a temperature in the range of about 140 to 170 degrees Fahrenheit, for a typical preheating time of somewhere around three hours to ten hours, in this embodiment. (All reference to degrees of temperature herein are stated in terms of degrees on the Fahrenheit scale.) Following is step 428, in which lined pipe 10 is filled with a liquid polyurethane compound, which is applied to the inner surface and the pipe end surfaces 32 and 34 of lined pipe 10, including the inner surface of rubber liner portion 14. This liquid polyurethane compound may be of the type produced by Irathane Systems, Inc. as polyurethane compound #2865, for example. The liquid polyurethane compound may be applied by a method of centrifugal casting, for example. The liquid polyurethane compound is applied in a calibrated and metered flow, in the embodiment of FIG. 4. Alternative embodiments include application onto the rubber liner portion 14 of a material including other types of polyurethane and other polymeric materials including those incorporating free isocyanate groups, for example. Alternative embodiments also include other methods, familiar to those in the art, of applying the liquid polyurethane compound or other material onto rubber liner portion 14.

Lined pipe 10 with newly applied polyurethane is then cured in a cure oven at a temperature in the range of about 140 to 170 degrees Fahrenheit in step 429, for a typical curing time that depends on the temperature. For example, at a curing temperature of 140 degrees, a typical curing time of about 16 hours is preferred, while at a curing temperature of 170 degrees, a typical curing time of about 13 hours is preferred, in this embodiment. Polyurethane liner portion 16 is thereby disposed on the inner surface of rubber liner portion 14, adhering securely thereto. Other curing temperatures and times are also contemplated in alternative embodiments, both below 140 degrees and above 170 degrees, with corresponding curing times.

Polyurethane liner portion 16 is composed of polyurethane in this illustrative embodiment, and may comprise other types of elastomers, polymeric materials, and similar substances in alternative embodiments. Polyurethane is also sometimes referred to casually as urethane, despite the technical distinction between them. Polyurethane liner portion 16 is highly resistant to deterioration due to cuts and abrasion, heat, and hydrocarbons. Polyurethane liner portion 16 in combination with underlying rubber liner portion 14 forms liner 12, which is also highly resistant to deterioration by impacts of particulate matter and to blistering or disbondment such as due to vapor permeability and cold wall effect, while handling substantial slurry flows with high heat, high hydrocarbon content, and high particulate matter content with large particle diameters.

As illustrated particularly in FIG. 2, lined pipe 10 has pipe end surfaces 32 and 34. Unlike rubber liner portion 14, polyurethane liner portion 16 extends into contiguous polyurethane end surfaces 42 and 44 disposed on pipe end surfaces 32 and 34, in the embodiment of FIGS. 1 and 2. Pipe portion 18, polyurethane liner portion 16, and polyurethane end surfaces 42 and 44 thereby substantially cover or enclose rubber liner portion 14, in this embodiment. A slip-on flange 36 is also provided at first end 22 and a lap joint flange 38 is provided at second end 24, in this embodiment. Slip-on flange 36 and lap joint flange 38 may be applied in step 426 as a component of step 420. These features contribute to ensuring that pipe end surfaces 32 and 34 of a first lined pipe 10 are able to form secure, aligned seals with corresponding end surfaces of similar, additional lined process support elements.

FIG. 2 also depicts end caps 66 and 68 for attaching to first end 22 and second end 24, respectively. Slip-on flange 36, lap joint flange 38, and end caps 66 and 68 are a few examples of a wide variety of flanges, tooling, and other supplemental structures that may be added to lined pipe 10.

As those skilled in the art will appreciate, other types of flanges can be used in alternative embodiments. Slip-on flange 36, lap joint flange 38, pipe end surface 34, and polyurethane end surface 44 are also illustrated in FIG. 1, in which the details of lined pipe end 22 are obscured due to the perspective view. Large numbers of process support elements similar to lined pipe 10 may thus be connected together to create long pipelines and a great variety of other structures for the transportation and manipulation of process materials. Lined pipe 10 may also be connected with a wide variety of associated components such as elbows and fittings that may also be treated with liner 12 to create a variety of pipeline and associated transport and processing structures.

FIG. 3 illustrates an example of such an additional example of a lined support element, lined piping elbow 310, that may be combined with lined pipe 10 and similar components in the assembly of pipelines and other large-scale piping structures. Lined piping elbow 310 includes an angled pipe section rather than being substantially axially symmetric about a longitudinal axis as is lined pipe 10. Lined piping elbow 310 is another example of a lined support element, that further illustrates some of the variety of embodiments of support elements of the present invention.

Lined piping elbow 310 includes liner 312, which includes both a rubber liner portion 314 and a polyurethane liner portion 316, adhering together and to the exterior steel pipe portion 318, as illustrated in cutaway. Rubber liner portion 314 and polyurethane liner portion 316 are composed and assembled together with exterior steel pipe portion 318 by processes similar to those described above in reference to lined pipe 10 and method 400. The present invention therefore includes embodiments in the form of substantially straight pipe portions such as lined pipe 10, and angled pipe portions such as lined piping elbow 310, among other embodiments.

First elbow end 322 is illustrated on one end of lined piping elbow 310, and second elbow end 324 is illustrated on second end of lined piping elbow 310. First elbow end 322 includes pipe end surface 332, polyurethane end surface 342, and slip-on flange 336. Second elbow end 324 includes pipe end surface 334, polyurethane end surface 344, and lap joint flange 338. Slip-on flange 336 and lap joint flange 338 are useful for connecting lined piping elbow 310 with other process support elements, similarly as described above with reference to lined pipe 10. Polyurethane end surfaces 342 and 344 are contiguous with polyurethane liner portion 316 and extend partially over pipe end surfaces 332 and 334, respectively, thereby enclosing rubber liner portion 314. Liner 312 of lined piping elbow 310 therefore features high resistance to deterioration due to cuts and abrasion, heat, hydrocarbons, impacts of particulate matter, and blistering or disbondment such as due to vapor permeability and cold wall effect, while handling substantial slurry flows with high heat, high hydrocarbon content, and high particulate matter content with large particle diameters.

Although the present invention has been described with reference to illustrative embodiments, workers skilled in the art will recognize that changes may be made in form and detail, such as applying additional layers of rubber and polyurethane or a rubber liner portion applied over a polyurethane liner portion, for example, without departing from the spirit and scope of the invention.

What is claimed is:

1. An apparatus for transporting a tar sands slurry, the apparatus comprising:
   at least one pipe element in a pipeline, the pipe element comprising an inner surface defining an internal passageway therein;
   a rubber layer disposed on the inner surface of the pipe element; and
   means for covering the rubber layer to protect the rubber layer from the tar sands slurry while the tar sands slurry is being transmitted inside the pipe element.

2. The apparatus of claim 1, comprising means for covering the rubber layer to protect the rubber layer from the tar sands slurry comprising hydrocarbons and particulate material.

3. The apparatus of claim 2, wherein the rubber layer is configured to provide cushioning for impacts of the particulate material of the tar sands slurry.

4. The apparatus of claim 1, comprising means for covering the rubber layer to protect the rubber layer from the tar sands slurry comprising hot water.

5. The apparatus of claim 1, wherein the means for covering the rubber layer is thicker than the rubber layer.

6. A pipe for transporting a tar sands slurry, the pipe comprising:
   a pipe element, the pipe element comprising an inner surface defining an internal passageway therein;
   a rubber layer disposed on the inner surface of the pipe element; and
   a heat-cured polyurethane layer covering the rubber layer such that the heat-cured polyurethane layer prevents contact between the rubber layer and the tar sands slurry, and
   wherein the heat-cured polyurethane layer is thicker than the rubber layer.

7. The pipe of claim 6, wherein the rubber layer acts as a permeability barrier to prevent blistering or disbondment of the heat-cured polyurethane layer due to vapor permeability or cold wall effect.

8. The pipe of claim 6, wherein the rubber layer provides cushioning for impacts of particulate matter of the tar sands slurry.

9. The pipe of claim 6, wherein the heat-cured polyurethane layer is cured at a temperature in the range of about 140 to 170 degrees Fahrenheit.

10. A method of transporting a tar sands slurry, the method comprising:
   providing at least one pipe element in a pipeline, the pipe comprising:
      an inner surface defining an internal passageway therein;
      a rubber layer disposed on the inner surface of the pipe element; and
      a heat-cured polyurethane layer covering the rubber layer; and
   moving the tar sands slurry through the pipe element wherein the tar sands slurry contacts the heat-cured polyurethane layer and the heat-cured polyurethane layer prevents contact between the rubber layer and the tar sands slurry and thereby extends the useful life of the pipe element.

11. The method of claim 10, wherein the heat-cured polyurethane layer is thicker than the rubber layer.

12. An apparatus for transporting a tar sands slurry comprising hydrocarbons and particulate material, the apparatus comprising:
   at least one pipe element in a pipeline, the pipe element comprising an inner surface defining an internal passageway therein;
   first means for covering an inner surface of the pipe element and providing cushioning for impacts due to the particulate material being transported in the pipe element; and
   second means for protecting the first means from the hydrocarbons and the particulate material being transported inside the pipe element.

13. The apparatus of claim 12, wherein the first means comprises a rubber layer.

14. The apparatus of claim 13, wherein the second means is configured for resisting hot water.

15. The apparatus of claim 13, wherein the second means comprises a heat-cured polyurethane layer.

16. The apparatus of claim 15, wherein the heat-cured polyurethane layer is cured at a temperature in the range of about 140 to 170 degrees Fahrenheit.

17. The apparatus of claim 12, further comprising adhesive means for adhering the first means to the pipe element.

18. The apparatus of claim 17, further comprising primer means for adhering the adhesive means to the inner surface of the pipe element.

19. The apparatus of claim 12, wherein the second means is thicker than the first means.

* * * * *